United States Patent [19]

Peterson

[11] Patent Number: 5,638,338

[45] Date of Patent: Jun. 10, 1997

[54] SEISMIC PROCESSING APPARATUS AND METHOD

[76] Inventor: Fred M. Peterson, P.O. Box 3507, Canmore, AB., Canada, T0L 0M0

[21] Appl. No.: 543,280

[22] Filed: Oct. 16, 1995

[51] Int. Cl.$^6$ .................................................. G01V 1/37
[52] U.S. Cl. .................................................. 367/46; 367/73
[58] Field of Search .................................. 367/38, 46, 73; 364/421, 422

[56] References Cited

U.S. PATENT DOCUMENTS 4,488,270  12/1984  Ruehle ........................................ 367/73
4,688,198   8/1987  Wiggins ...................................... 367/46

OTHER PUBLICATIONS

Rice, R. B., "Inverse Convolution Filters", Geophysics, vol. 27, No. 1, pp. 4–18 Feb. 1962.

Wavelet estimation revisited, Tadeusz J. Ulrych, Danilo R. Velis, and Mauricio D. Sacchi, The Leading Edge, Nov., 1995, pp. 1139–1143.

Measuring wavelet phase from seismic data, J.P. Lindsey, Geophysics: The Leading Edge of Exploration, Jul. 1988, pp. 10–16.

Application of Homomorphic Deconvolution to Seismology, T.J. Ulrych, Reprinted from Geophysics v. 36, No. 4, pp. 650–660, 1971, Geophysics reprint series, pp. 446–456.

Predictive Deconvolution: Theory and Practice, K.L. Peacock and Sven Treitel, Reprinted from Geophysics v. 34, No. 2, pp. 155–169, 1968, Geophysics reprint series, pp. 221–235.

Primary Examiner—Ian J. Lobo
Attorney, Agent, or Firm—Anthony R. Lambert

[57] ABSTRACT

A method of deconvolving surface measured seismic signals reflected from a sub-surface sequence of geological formations, in which the sub-surface sequence of geological formations contains an areally stable acoustic impedance sequence. An inverse filter is derived from correlating a seismic signal with a synthetic seismic log weighted at the time location of the areally stable acoustic impedance sequence. This inverse filter is applied to stacked or pre-stacked seismic signals to produce a deconvolved seismic signal. In a particularly powerful embodiment of the invention, several inverse filters are derived in this manner at several geographic locations within the area of stability of the areally stable acoustic impedance sequence. These several inverse filters are then averaged to produce an average inverse filter which is used to deconvolve a seismic signal in the area of stability. Apparatus for carrying out the invention is also disclosed.

13 Claims, 8 Drawing Sheets

SEISMIC PROCESSING APPARATUS AND METHOD

FIELD OF THE INVENTION

This invention relates to methods and apparatus for processing seismic signals.

BACKGROUND OF THE INVENTION

In the oil and gas industry seismic trace data (S{t}) is generally modelled as a seismic wavelet (W{t}) convolved with a reflection coefficient sequence (R{t}) plus an additive noise component (N{t}). It can be written as follows: (1) S{t}=W{t}*R{t}+N{t}, where * represents convolution.

The desired result of the seismic investigation process is to obtain the best estimate of the reflection coefficients. When complex wavelets are present on the trace records it causes the interpretation (i.e. estimate of the principle characteristics of the reflection coefficient sequence) of the seismic data to be difficult. Subsequent inversion of the seismic data to an impedance or reflectivity estimate is similarly difficult or impossible.

Deconvolution, to reduce the wavelet to a simple, known and desirable form, is routinely applied during the digital processing of the seismic data. A considerable body of research and publications clearly documents the methods currently available. They include statistical methods based on the minimum phase assumption such as the Wiener-Levinson method, the sparse spike assumption, homomorphic methods and others. These methods all have some success but in general also have some deficiencies under various conditions.

Where well control exists, matching filters between the well data and the processed and stacked seismic data are sometimes derived at the projected locations of that well control onto the seismic line or volume. The matching filter, in some circumstances, can reduce the wavelet to its desired form at the well location but is only valid at that specific location and does not address lateral changes occurring in the wavelet.

SUMMARY OF THE INVENTION

Geological sequences in many of the hydrocarbon producing basins of the world have some characteristics which have a slow rate of spatial variation. Major stratigraphic sequences may have no significant acoustic impedance variability over distances of a few miles or a few hundred miles. Since the reflection coefficient sequence is defined by the acoustic impedance sequence, if the impedance is effectively constant for certain seismic wavelengths then the reflection coefficient sequence will also be constant for those wavelengths. Such an acoustic impedance sequence is called areally stable.

The method of this invention can be used in conjunction with any of the current deconvolution methods to improve the deconvolution by using a deconvolution operator derived from matching a seismic signal, which is to be deconvolved, with synthetic seismograms derived from a sub-surface recording of acoustic characteristics of the sub-surface sequence of geological formations including at least in part the areally stable acoustic impedance sequence.

Therefore, in accordance with one aspect of the invention, there is provided a method of deconvolving surface measured seismic signals reflected from a subsurface sequence of geological formations, in which the sub-surface sequence of geological formations contains an areally stable acoustic impedance sequence. An inverse filter is derived from correlating a seismic signal with a synthetic seismic log weighted at the time location of the areally stable acoustic impedance sequence. This inverse filter is applied to stacked or pre-stacked seismic signals to produce a deconvolved seismic signal. In a particularly powerful embodiment of the invention, several inverse filters are derived in this manner at several geographic locations within the area of stability of the areally stable acoustic impedance sequence. These several inverse filters are then averaged to produce an average inverse filter which is used to deconvolve a seismic signal in the area of stability.

Apparatus for carrying out the invention is also disclosed. These and further aspects of the invention are now described, and claimed in the claims that follow.

BRIEF DESCRIPTION OF THE DRAWINGS

There will now be described preferred embodiments of the invention, with reference to the drawings, by way of illustration, in which like numerals denote like elements and in which.

DETAILED DESCRIPTION OF PREFERRED EMBODIMENTS

Figure 1:
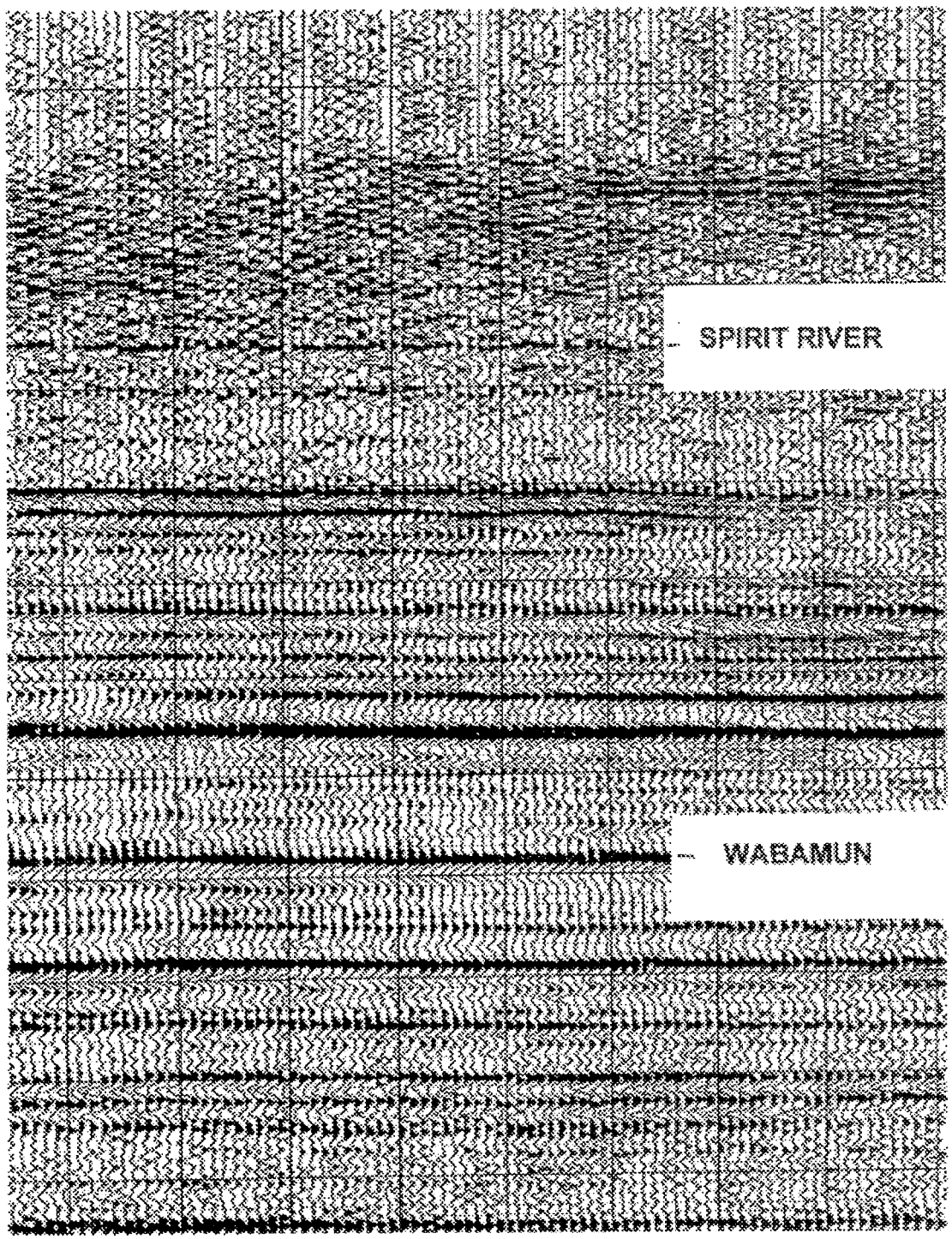
FIG. 1 is an exemplary seismic section containing a representation of seismic signals to which the invention may be applied.

Referring to FIG. 1, there is shown a conventional display of exemplary stacked surface measured seismic signals from a sub-surface sequence of geological formations in which the sub-surface sequence of geological formations contains two areally stable acoustic impedance sequences whose seismic signatures on FIG. 1 have been identified by the notations WABAMUN and SPIRIT RIVER. Each trace shown in FIG. 1 represents a seismic signal $S_m(t)$. During seismic signal processing in exemplary apparatus shown schematically in FIG. 2, each seismic signal $S_m(t)$ is stored in a memory 10 from which the seismic signal may be sourced as needed. Each seismic signal $S_m(t)$ is produced by conventional surface measurement of energy reflected from the sub-surface sequence of geological formations.

Figure 3:
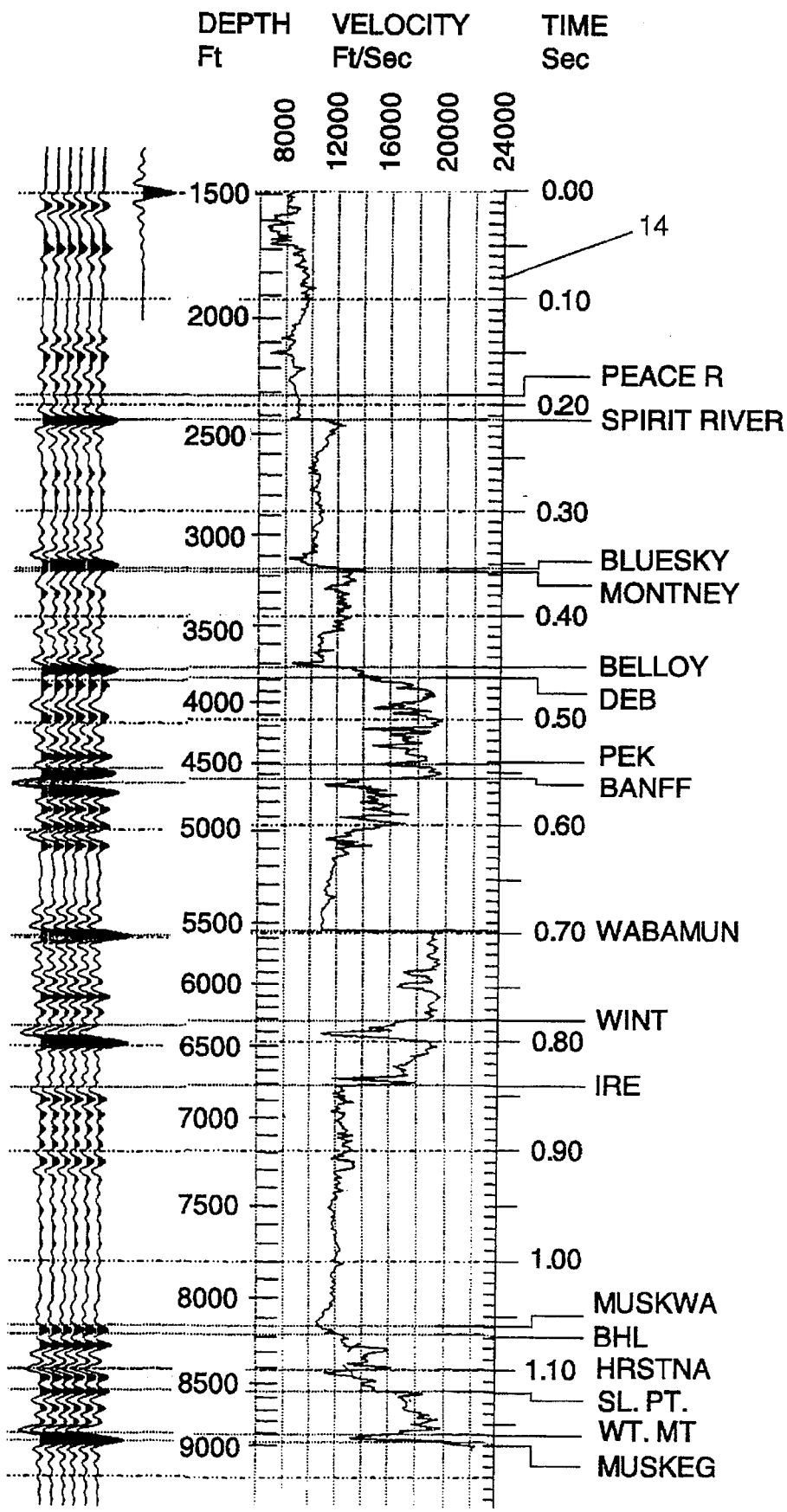
FIG. 3 is a schematic of a sonic log and corresponding synthetic seismic section for use in carrying out the invention.

To produce an inverse filter to apply to the seismic signal, a synthetic seismic signal $S_v(t)$ is required that has been produced from a sub-surface recording of acoustic characteristics of the sub-surface sequence of geological formations. Conventionally, such synthetic seismic signals $S_v(t)$ are produced by convolving a known wavelet, such as an Ormsby wavelet, with a sonic log 14, such as is illustrated in FIG. 3. The acoustic characteristic that is conventionally measured to produce the sonic log is the velocity of a sound wave in the subsurface sequence of geologic formations. As can be seen in FIG. 3, the sonic log 14 traverses the areally stable acoustic impedance sequence. The synthetic seismic signal $S_v(t)$ derived from the sonic log 14 is stored in a memory 12 from which the synthetic seismic signal $S_v(t)$ may be sourced as needed. Memory 10 and memory 12 may be at different addresses of the same computer memory.

Figure 4:
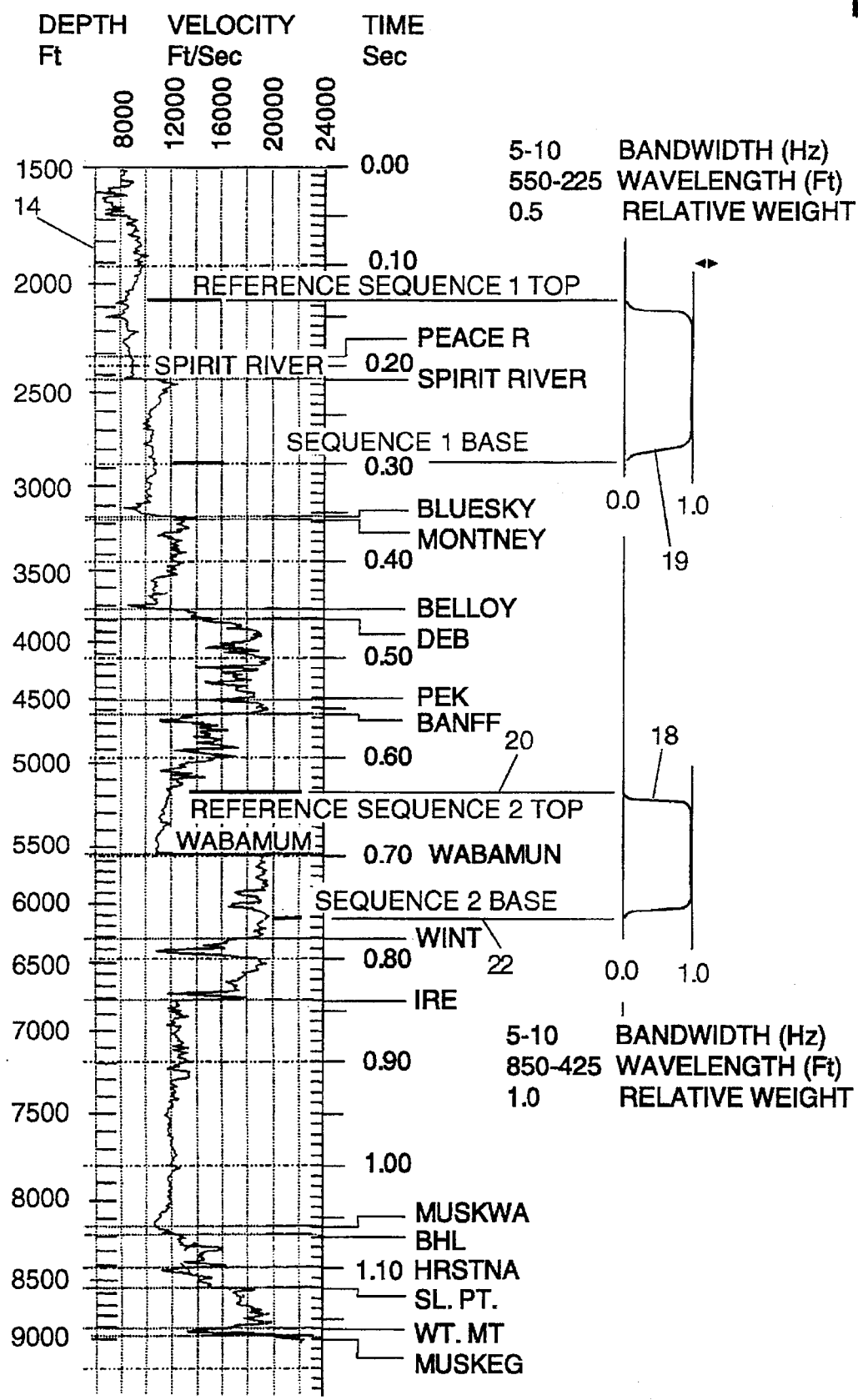
FIG. 4 is a schematic of a sonic log and corresponding synthetic seismic section for use in carrying out the invention showing a weighting function.

The synthetic seismic signal $S_v(t)$ must be weighted to emphasize the seismic signature at the time location of the areally stable acoustic impedance sequence. This can be achieved by applying a weighting function 18 to the synthetic seismic signal, as for example in an arithmetic logic unit 16. Arithmetic logic unit 16 forms a means for applying the weighting function 18 to the synthetic seismic signal $S_v(t)$. The weighting function 18 should have a maximum at the time location of the areally stable acoustic impedance sequence. An exemplary weighting function 18 is shown in FIG. 4. The weighting function 18 may be 1 in a small window having a top 20 and a base 22 that includes the time location of the areally stable acoustic impedance sequence and zero elsewhere. It is acceptable if the weighting function 18 deviates slightly from having a maximum at the time location of the areally stable acoustic sequence providing the effect of the weighting function 18 is to make the synthetic seismic signature at the areally stable acoustic impedance sequence the dominant influence on the shape of an inverse filter derived from the synthetic seismic signal. The output of the ALU 18 is a weighted synthetic seismic signal $S_w(t)$.

Seismic signal $S_m(t)$ and weighted synthetic seismic signal $S_w(t)$ are applied to a correlator 24. Correlator 24 derives the defining characteristics of an inverse filter $W^{-1}(t)$ such that $S_m(t)*W^{-1}(t) \approx S_w(t)$. Correlator 24 may form part of a digital computer that has been programmed in conventional fashion to derive an inverse filter from two input signals or that has been specially built for this purpose. In general, the process of deriving an inverse filter from two input signals is well known, and may be carried out with several known techniques including Wiener-Levinson filtering and division of Fourier transforms of the input signals. Typically, the application of the inverse filter $W^{-1}(t)$ only results in a best fit approximation, such as in a least squares sense, between the seismic signal $S_m(t)$ and the weighted synthetic seismic signal $S_w(t)$. Hence, convolution of the synthetic seismic signal $S_m(t)$ with the inverse filter $W^{-1}(t)$ yields an approximation of the weighted synthetic signal $S_w(t)$ at the time location of the areally stable acoustic impedance sequence.

A second areally stable acoustic impedance sequence may be used to derive another estimate of the inverse filter $W^{-1}(t)$. That is, referring to FIG. 4, both the WABAMUN and SPIRIT RIVER sequences may be used. A second weighting function 19 may be applied to the synthetic seismogram at the time location of the second areally stable acoustic impedance sequence. The second weighting function 19 may have a lower relative weighting such as 0.5 and a differently sized window, but will otherwise have the same characteristics of the first weighting function 18. Both weighting functions 18 and 19 may be used to improve the approximation of the inverse filter $W^{-1}(t)$.

Figure 2:
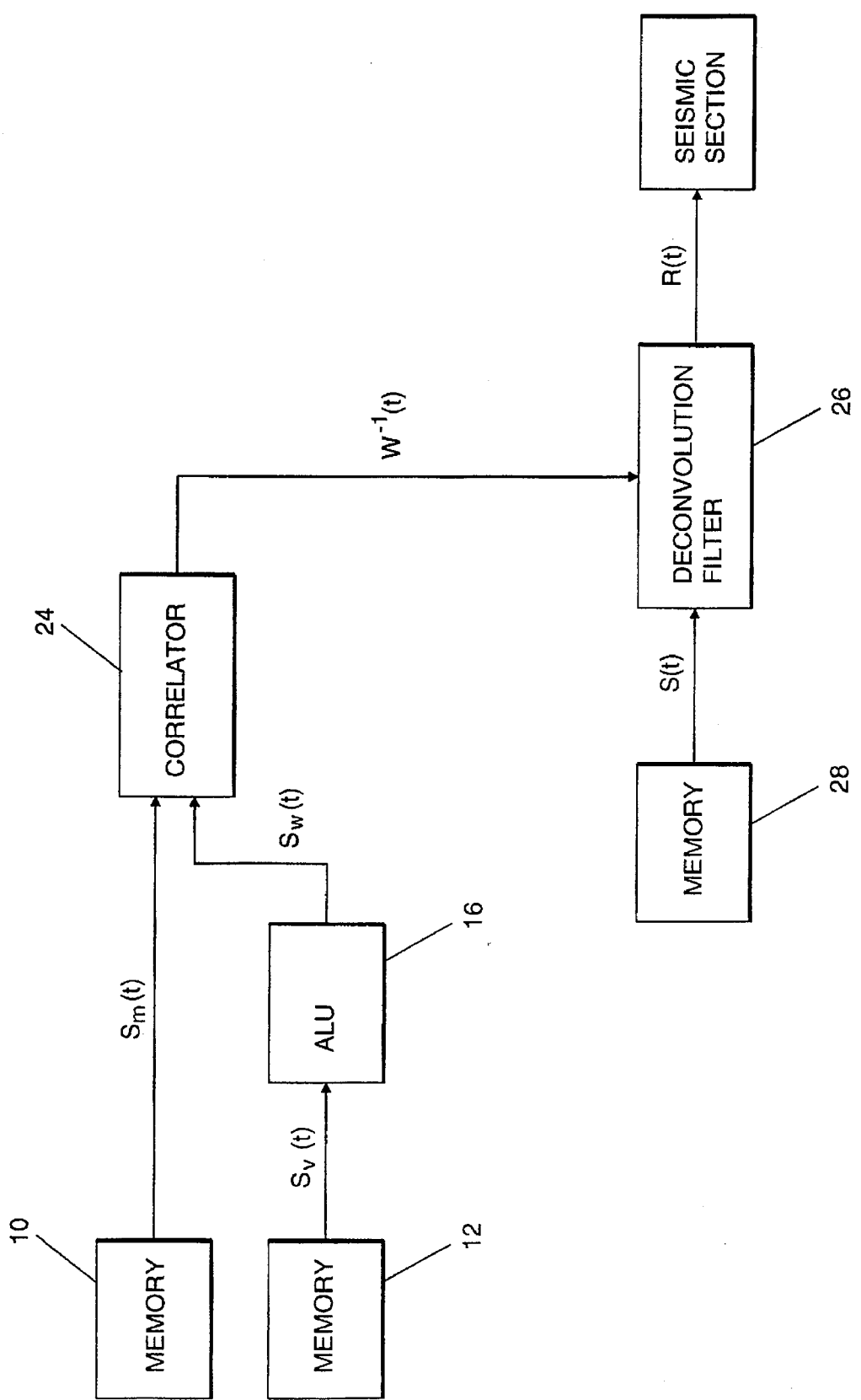
FIG. 2 is a schematic showing apparatus according to one embodiment of the invention.
Figure 2A:
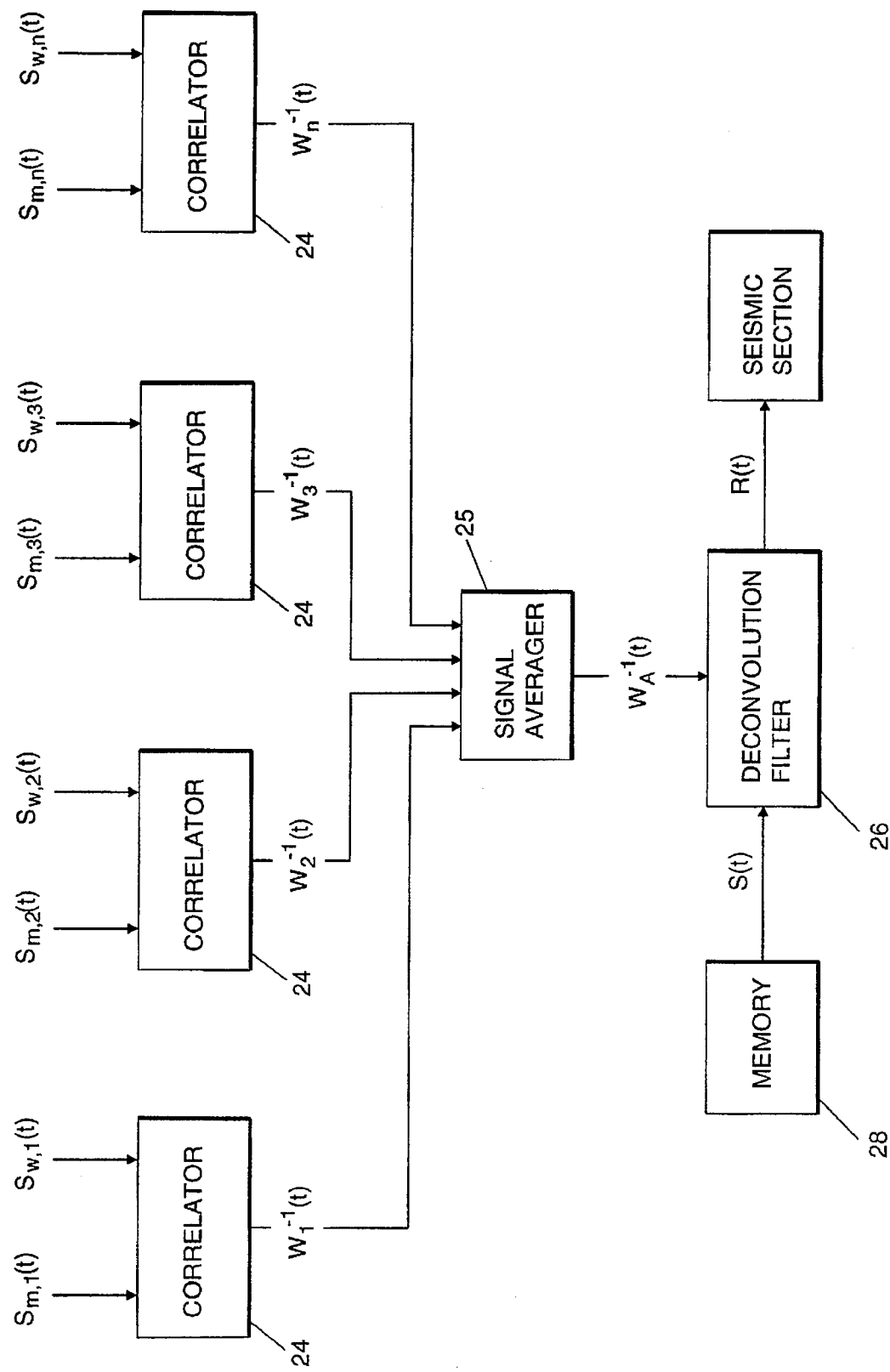
FIG. 2A is a schematic showing apparatus according to a second embodiment of the invention.

Several traces $S_{m,1}(t)$, $S_{m,2}(t)$ may be taken from within a geographic area in which the areal stable acoustic impedance sequence is stable, and several estimates of the inverse filter $W_1^{-1}(t)$, $W_2^{-1}(t)$, . . . may be made in like manner as shown in FIG. 2 using several weighted synthetic seismograms $S_{w,1}(t)$, $S_{w,2}(t)$ . . . each derived in the same manner as $S_w(t)$. These estimates of $W^{-1}(t)$ may be averaged, in some manner, for example by adding them and dividing by the number of estimates of $W^{-1}(t)$, in a signal averager 25 to form an averaged inverse filter $W_A^{-1}(t)$ as shown in FIG. 2A. Alternatively, the average could be formed by a weighted average in which some of the inverse filters $W_1^{-1}(t)$ are given greater weight that others. The traces $S_{m,i}(t)$ are taken from anywhere within the area 30 of stability of the areally stable acoustic impedance sequence. Likewise, the synthetic seismograms $S_{v,i}(t)$ are taken from anywhere within the area 30 of stability of the areally stable acoustic impedance sequence, preferably close to a respective one of the traces $S_{m,i}(t)$ (a corresponding seismic signal).

Figure 5:
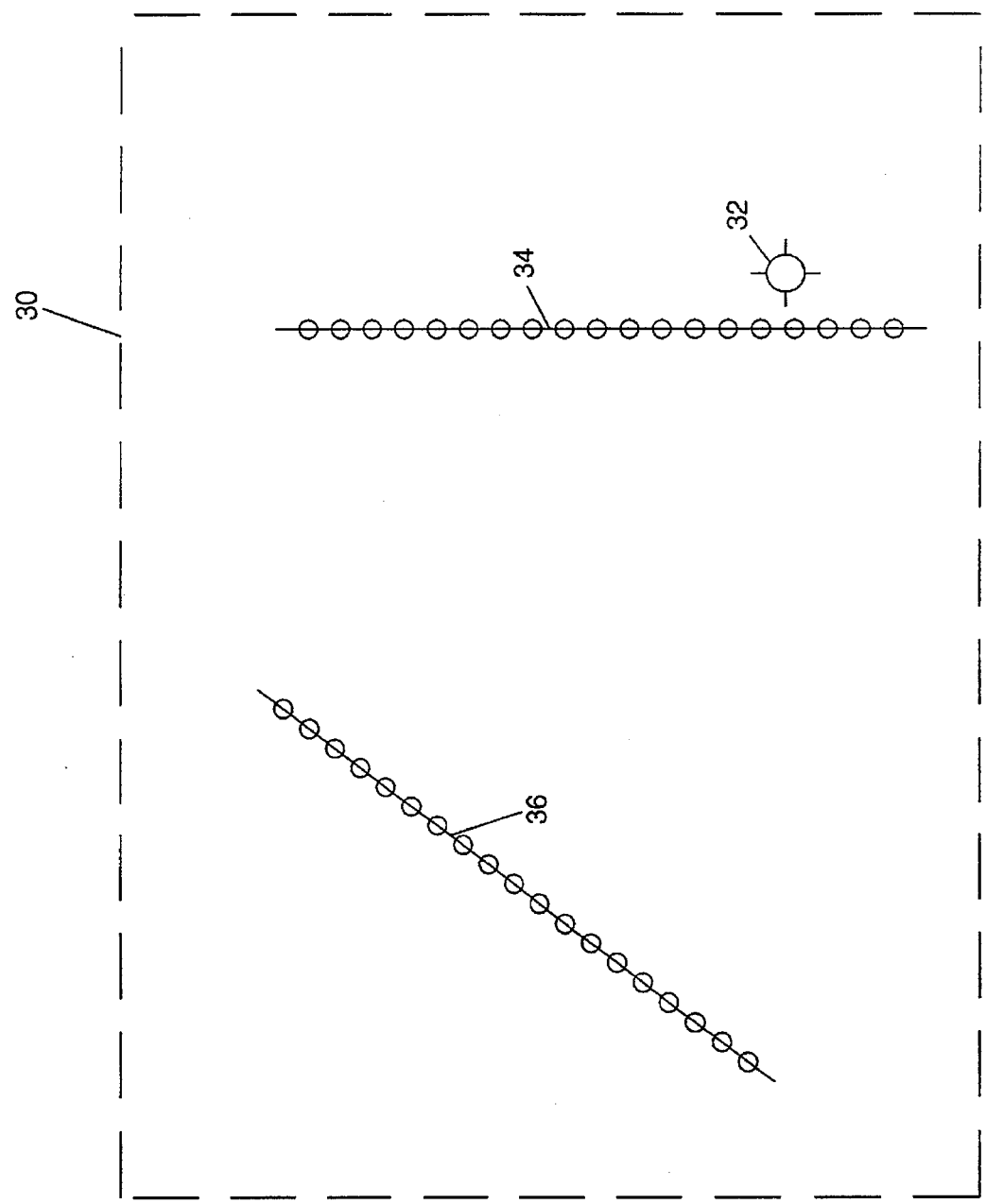
FIG. 5 is a schematic seismic map showing an exemplary well location and area of application of the method.
Figure 6:
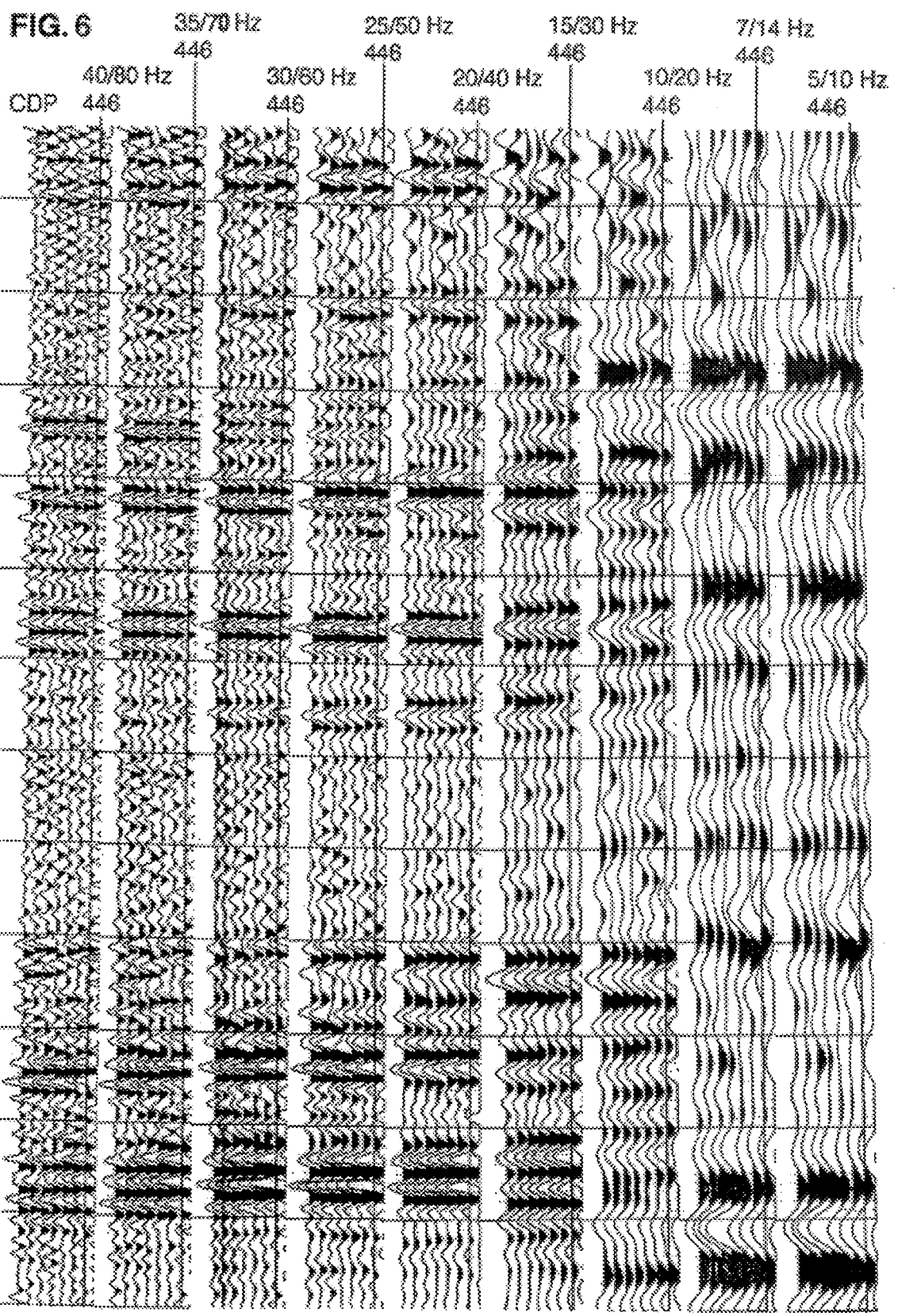
FIG. 6 is a display of an exemplary seismic signal processed according to the invention.

Once the inverse filter $W^{-1}(t)$ Or $W_A^{-1}(t)$ has been derived, it may be applied to filter a seismic signal S(t) in a deconvolution filter 26 to produce a deconvolved seismic signal R(t), that will be an approximation of the reflection coefficients of the sub-surface sequence of geologic formations. The seismic signal S(t) is sourced from a memory 28 (which may be a part of a larger memory containing memory 10 and 12). The seismic signal S(t) filtered by deconvolution filter 26 may be the entire signal $S_m(t)$ from which the inverse filter was derived, or it may be a second seismic signal that has been produced by surface measurement of energy reflected from a portion of the sub-surface sequence of geological formations that is within an area 30 (FIG. 5) in which the acoustic impedance is stable and distinct from the line along which the signal $S_m(t)$ was taken. Referring to FIG. 5, an inverse filter $W^{-1}(t)$ may be derived from a sonic log from well 32 and seismic signals measured along seismic line 34, or an average taken from several such inverse filters derived within area 30. However, the inverse filter $W^{-1}(t)$ or $W_A^{-1}(t)$ thus derived may then be applied to seismic line 36 which is within area 30, yet covers a different portion of the sub-surface from seismic line 34. Seismic lines 32 and 34 may intersect or they may be anywhere within area 30. Different areas 30 may apply to different areally stable acoustic sequences. Hence the area of stability of one formation, eg the SPIRIT RIVER, may differ from the area of stability of another formation WABAMUN and thus care must be taken in using inverse filters derived from more than one sequence. Seismic signal R(t) may then be displayed in conventional fashion, such as the seismic section shown in FIG. 1, or displayed for quality control, such as the band limited segments shown in FIG. 6.

Figure 7:
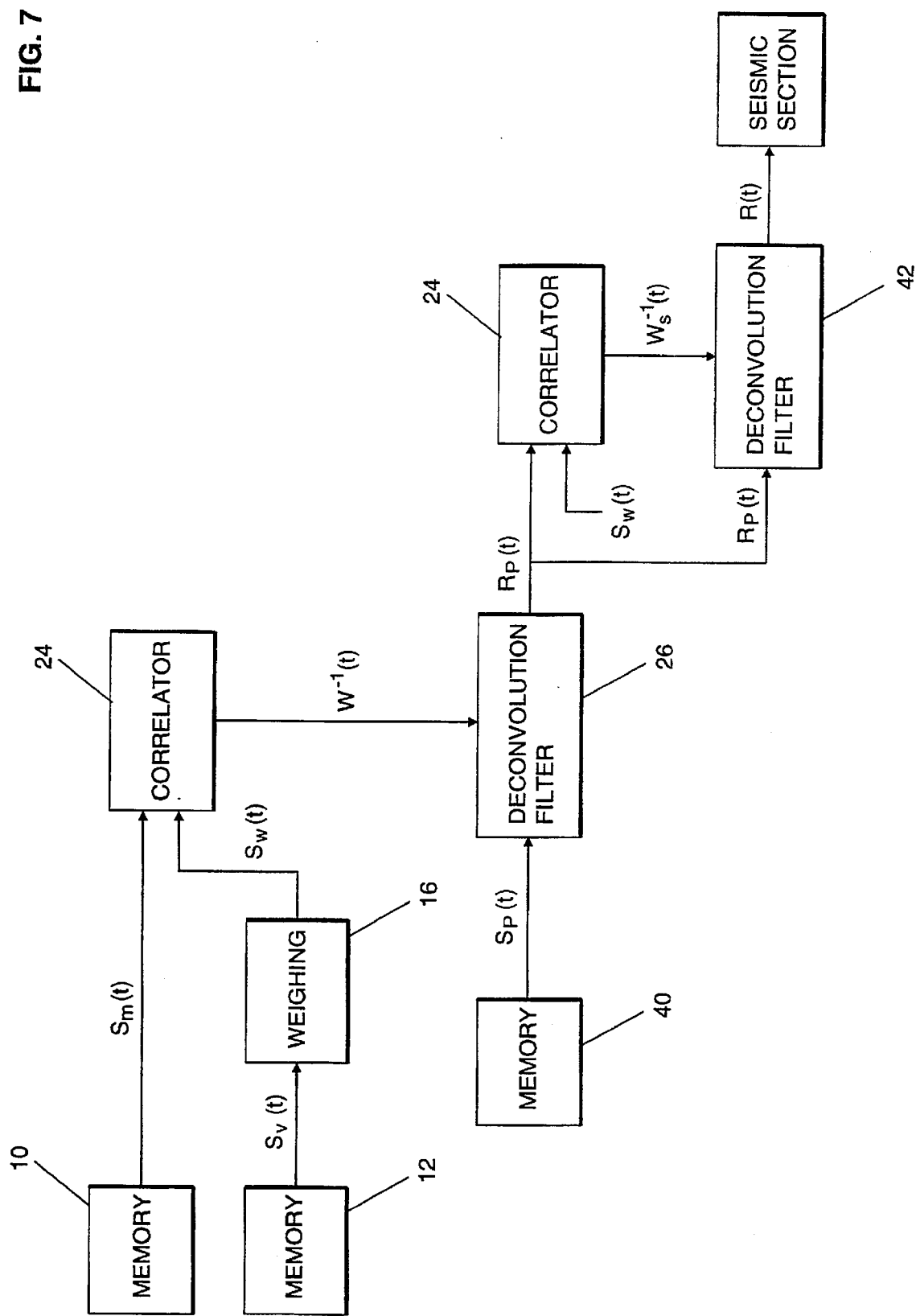
FIG. 7 is a schematic showing apparatus according to another embodiment of the invention.

The seismic signals $S_m(t)$ and S(t) may be a surface measured seismic signal before or after stacking. In an alternative embodiment, the inverse filter is used to deconvolve the seismic signal before stacking to produce a partially deconvolved seismic signal. Referring to FIG. 7, the filter 26 is applied to a pre-stack seismic signal $S_p(t)$ sourced from memory 40 to produce a partially deconvolved seismic signal $R_p(t)$. $R_p(t)$ and the weighted synthetic seismic signal $S_w(t)$ are input to correlator 24 to derive a second inverse filter $W_s^{-1}(t)$. $R_p(t)$ is then filtered in filter 42, which is defined by the second inverse filter $W_s^{-1}(t)$ to produce a fully deconvolved seismic signal R(t). R(t) may then be displayed in conventional fashion.

Various conventional methods may be applied during, before and after the process steps outlined here. For example, the first inverse filter, which will be formed at least in part in a given signal band, may be time shifted to force the time shift of the inverse filter in the given signal band to zero. In addition, various conventional solution constraints may be applied for example to render the solution surface consistent.

An exemplary areally stable acoustic impedance sequence in the Western Canada sedimentary basin is a sequence of Palaeozoic carbonate rocks, known as the Wabamun, which often has a stable large impedance over several tens of miles. It is also often overlain by younger sequences with stable and lesser impedance. This results in a significant stable reflection coefficient sequence from long wavelengths corresponding to 5 Hertz frequencies to short wavelengths corresponding to 100 Hertz frequencies (the typical frequencies used in seismic processing). The major unconformities present in this basin sequence can also be used as they are generally stable at long wavelengths although not necessarily at shorter wavelengths. The seismic interpreter chooses which sequences are stable for which wavelengths or bandwidths and a reference point for that sequence.

The effect of applying this method to seismic data sets has rendered a better estimate of the reflection coefficient sequence than achievable with conventional methods. It is a simple, robust method which can be utilized whenever the necessary a priori geological or geophysical knowledge is available.

The correlator 24, deconvolution filter 26 and signal averager 25 may each be for example general purpose computers programmed for the intended purpose, or they could be for example known geophysical work stations programmed for the intended purpose. While they could also be for example special purpose computers with hardware designed for the particular purpose, this gives limited flexibility to the hardware and is not preferred. The seismic section may be displayed on a monitor in conventional fashion or printed on paper in conventional fashion for subsequent viewing by a geophysicist.

A person skilled in the art could make immaterial modifications to the invention described in this patent without departing from the essence of the invention.

The embodiments of the invention in which an exclusive property or privilege is claimed are defined as follows:

1. A method of deconvolving surface measured seismic signals reflected from a sub-surface sequence of geological formations, in which the sub-surface sequence of geological formations contains an areally stable acoustic impedance sequence at a known time location, the method comprising the steps of:

obtaining at least first and second seismic signals representing surface measurements of energy reflected from the sub-surface sequence of geological formations;

obtaining at least first and second synthetic seismic signals from a sub-surface recording of acoustic characteristics of the sub-surface sequence of geological formations including at least in part the areally stable acoustic impedance sequence;

weighting the first and second synthetic seismic signals with a weighting function whose value is maximum at the time location of the areally stable acoustic impedance sequence to produce first and second weighted synthetic seismic signals;

deriving a first inverse filter from the first seismic signal and the first weighted synthetic seismic signals, the inverse filter being defined such that convolution of the first weighted synthetic seismic signal with the first inverse filter yields an approximation of the first seismic signal at the time location of the areally stable acoustic impedance sequence;

deriving a second inverse filter from the second seismic signal and the second weighted synthetic seismic signal, the second inverse filter being defined such that convolution of the second weighted synthetic seismic signal with the second inverse filter yields an approximation of the second seismic signal at the time location of the areally stable acoustic impedance sequence;

averaging the first and second inverse filters to produce a deconvolution inverse filter;

filtering a seismic signal which is to be deconvolved with the deconvolution inverse filter to produce a deconvolved seismic signal, in which the seismic signal represents seismic energy reflected from the sub-surface sequence of geologic formations that includes the areally stable acoustic impedance sequence; and displaying the deconvolved seismic signal as a seismic section.

2. The method of claim 1 in which the seismic signal to be deconvolved is a stacked seismic signal.

3. The method of claim 2 in which the deconvolution inverse filter, is applied to a pre-stack seismic signal to produce a partially deconvolved seismic signal.

4. The method of claim 3 further including:

deriving a third inverse filter from the partially deconvolved seismic signal and the synthetic seismic signal.

5. The method of claim 4 further including filtering the partially deconvolved seismic signal with a filter defined by the third inverse filter to produce a fully deconvolved seismic signal.

6. The method of claim 1 in which the first and second inverse filters are formed at least in part in a given signal band, and further including:

forcing the time shift of the first and second inverse filters in the given signal band to zero.

7. A method of deconvolving surface measured seismic signals reflected from a sub-surface sequence of geological formations, in which the sub-surface sequence of geological formations contains an acoustic impedance sequence that is areally stable over an extensive geologic area, the method comprising the steps of:

obtaining a first seismic signal representing surface measurements of energy reflected from a first portion of the sub-surface sequence of geological formations;

obtaining a synthetic seismic signal, the synthetic seismic signal having been produced from a sub-surface recording of acoustic characteristics of the sub-surface sequence of geological formations including at least in part the areally stable acoustic impedance sequence;

weighting the synthetic seismic signal with a weighting function whose value is maximum at the time location of the areally stable acoustic impedance sequence;

deriving a first inverse filter from the seismic signal and the weighted synthetic seismic signal, the first inverse filter being defined such that convolution of the weighted synthetic seismic signal with the first inverse filter yields an approximation of the seismic signal at the time location of the areally stable acoustic impedance sequence;

filtering a second seismic signal that has been produced by surface measurement of energy reflected from a second portion of the sub-surface sequence of geological formations with a filter defined by the first inverse filter to produce a deconvolved seismic signal, wherein the second portion of the sub-surface sequence of geological formations is within the area in which the acoustic impedance is stable and distinct from the first portion;

displaying the deconvolved seismic signal as a seismic section.

8. The method of claim 7 in which the seismic signal is a stacked seismic signal.

9. The method of claim 8 in which the filter is applied to a pre-stack seismic signal to produce a partially deconvolved seismic signal.

10. The method of claim 9 further including deriving a second inverse filter from the partially deconvolved seismic signal and the synthetic seismic signal.

11. The method of claim 10 further including filtering the partially deconvolved seismic signal with a filter defined by the second inverse filter to produce a fully deconvolved seismic signal.

12. Seismic processing apparatus for deconvolving surface measured seismic signals reflected from a sub-surface sequence of geological formations, in which the sub-surface sequence of geological formations contains an areally stable acoustic impedance sequence at a known time location, the seismic processing apparatus comprising:

a source of seismic signals produced by surface measurement of energy reflected from the sub-surface sequence of geological formations;

a source of synthetic seismic signals produced from a sub-surface recording of acoustic characteristics of the sub-surface sequence of geological formations including at least in part the areally stable acoustic impedance sequence;

means to weight the synthetic seismic signals with a weighting function whose value is maximum at the time location of the areally stable acoustic impedance sequence;

a correlator for correlating respective ones of the seismic signals with corresponding ones of the weighted synthetic seismic signals to yield at least one inverse filter defined such that convolution of one of the weighted synthetic seismic signals with one of the inverse filters yields an approximation of the seismic signal at the time location of the areally stable acoustic impedance sequence;

a filter for filtering seismic signals to produce deconvolved seismic signals, the filter being defined by the inverse filter; and display means for displaying deconvolved seismic signals as seismic sections.

13. The apparatus of claim 12 further including a signal averager for averaging plural inverse filters to produce an averaged inverse filter.

* * * * *